United States Patent [19]

Nelson

[11] Patent Number: 5,685,395
[45] Date of Patent: Nov. 11, 1997

[54] TREE SUSPENDED HUNTER SUPPORT DEVICE

[76] Inventor: Rick J. Nelson, 3361 W. Broadway, Muskogee, Okla. 74401

[21] Appl. No.: 616,282

[22] Filed: Mar. 15, 1996

[51] Int. Cl.⁶ .................................................. A01M 31/02
[52] U.S. Cl. .......................................... 182/187; 182/135
[58] Field of Search .................................. 182/187, 188, 182/135, 136, 20

[56] References Cited

U.S. PATENT DOCUMENTS

| | | |
|---|---|---|
| 3,116,806 | 1/1964 | Rose . |
| 3,856,111 | 12/1974 | Baker . |
| 4,337,844 | 7/1982 | Hice, Sr. . |
| 4,474,265 | 10/1984 | Shinkle . |
| 4,582,165 | 4/1986 | Latini . |
| 4,667,773 | 5/1987 | Davis . |
| 4,723,630 | 2/1988 | Wolford et al. . |
| 4,834,217 | 5/1989 | Manes . |
| 4,953,662 | 9/1990 | Porter . |
| 4,969,538 | 11/1990 | Amacker . |
| 4,987,972 | 1/1991 | Helms . |
| 5,052,516 | 10/1991 | Jamieson . |
| 5,090,504 | 2/1992 | Amacker . |
| 5,090,505 | 2/1992 | Amacker . |
| 5,143,176 | 9/1992 | Burdette . |
| 5,316,104 | 5/1994 | Amacker .......................... 182/187 |

*Primary Examiner*—Alvin C. Chin-Shue
*Attorney, Agent, or Firm*—Staas & Halsey

[57] ABSTRACT

A tree suspended hunter support device has two parallel bars, a tree wrap member, a cross bar and a bag. The two parallel bars extend in a first direction and have first and second ends. The tree wrap member extends between the two parallel bars at a first end of the parallel bars. The cross bar is positioned toward the first end of the parallel bars, and the position of the cross bar can be adjusted in the first direction. The cross bar together with the tree wrap member are adapted for closely surrounding a tree trunk. The bag encloses at least a portion of the two parallel bars such that a bottom of the bag is towards the first end of the parallel bars and rests on the cross bar. The bag has two holes in the vicinity of the bottom so that the parallel bars extend through the bag. The bag has a length and width sufficient for partially enclosing a human torso.

12 Claims, 7 Drawing Sheets

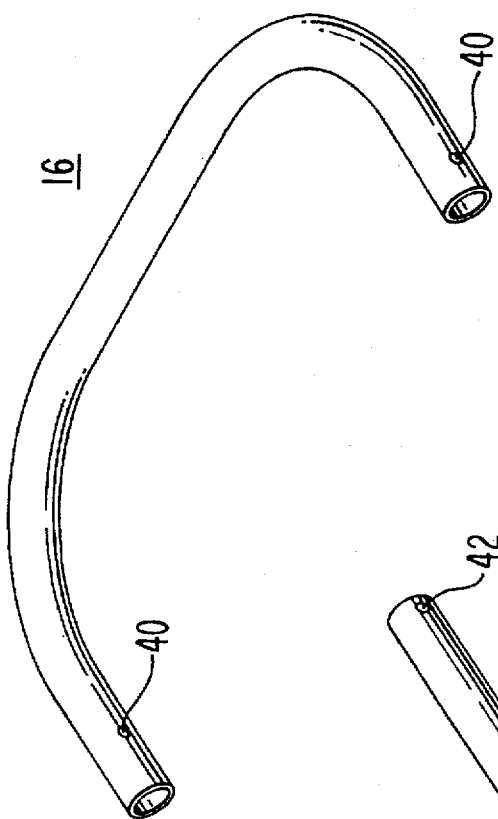
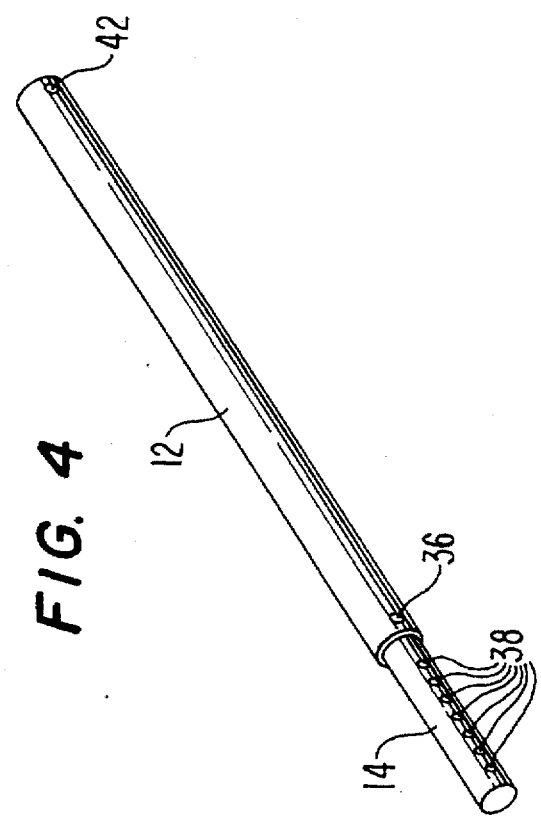
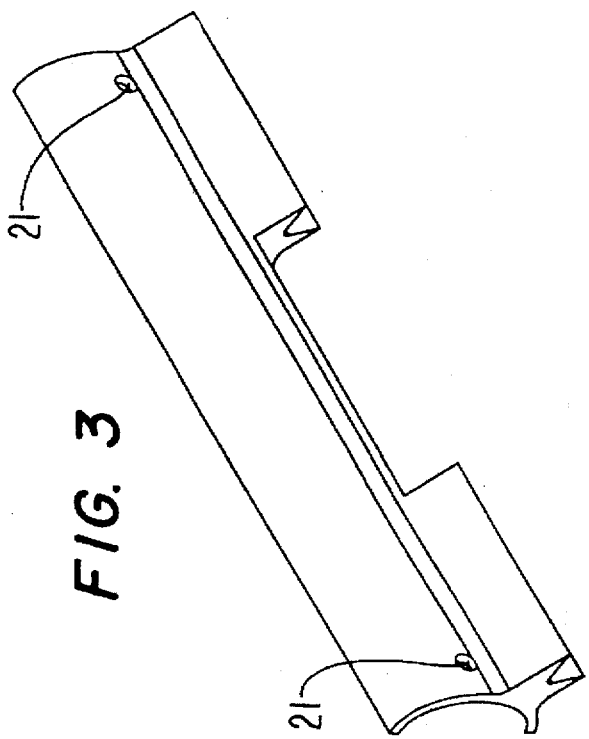

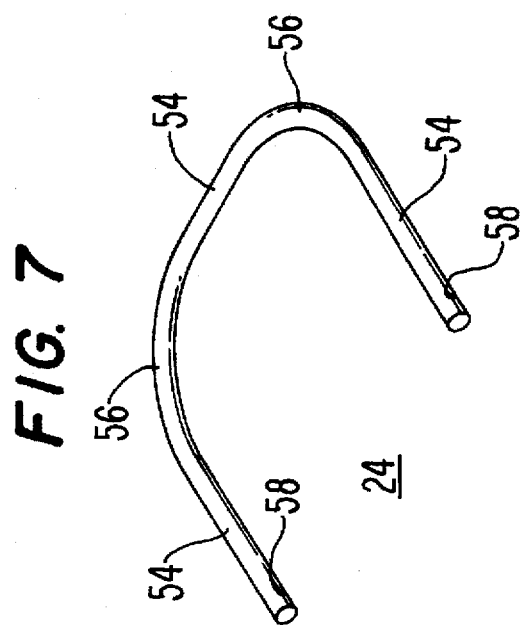
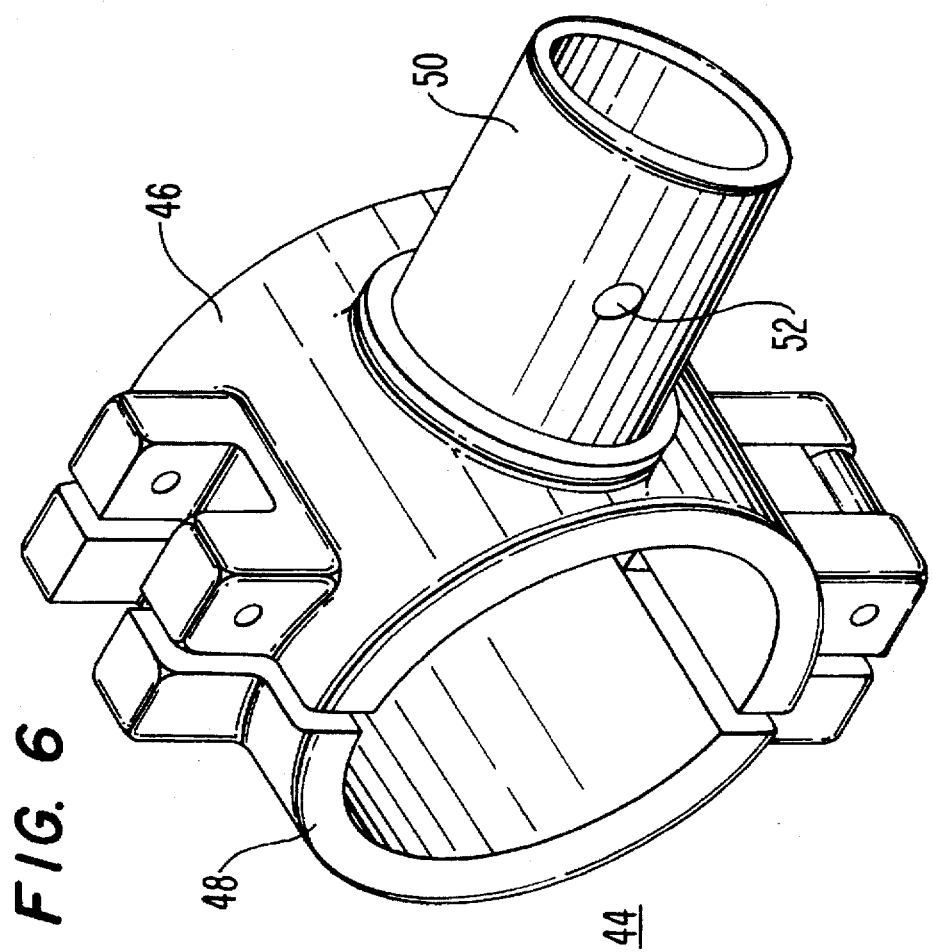

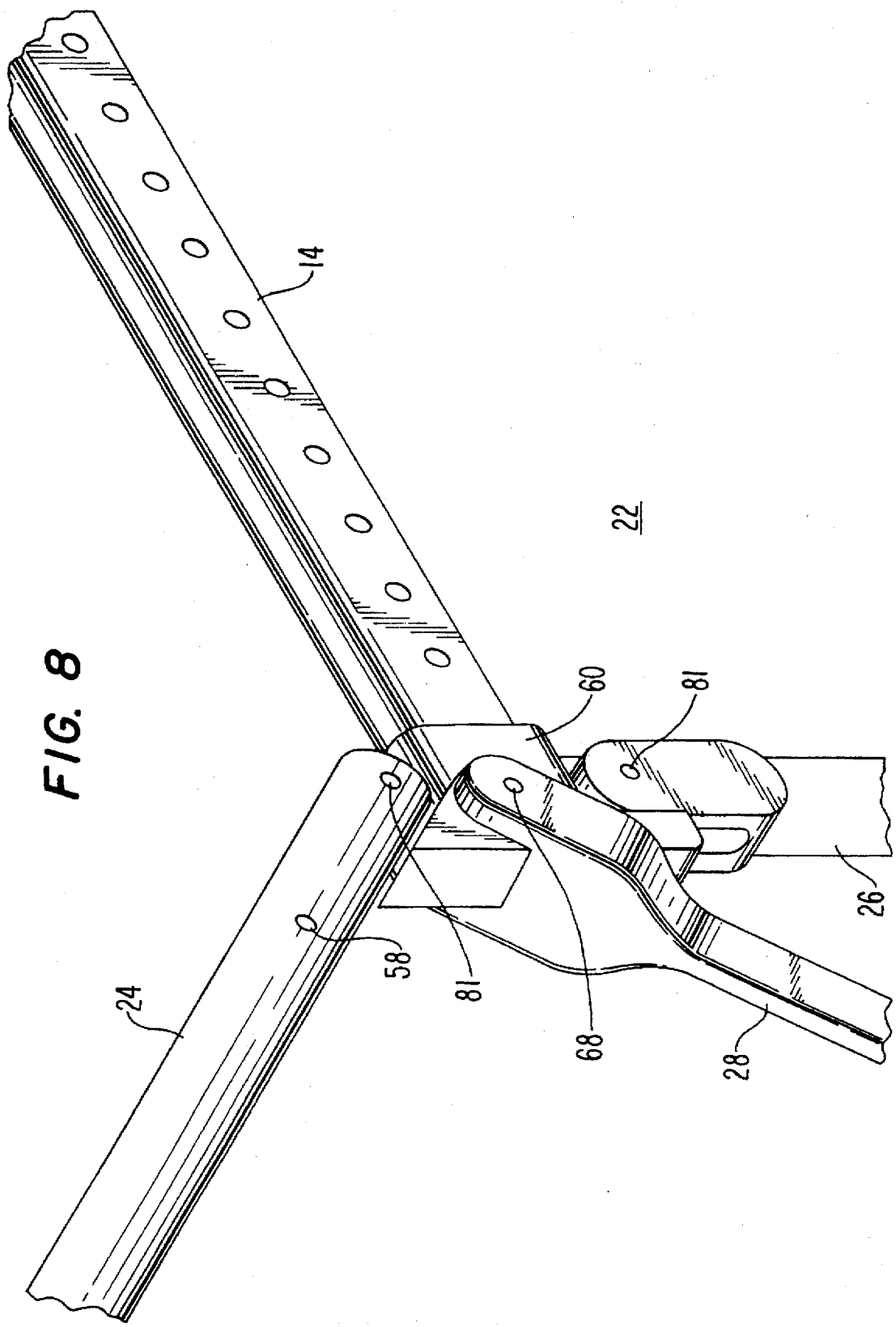

TREE SUSPENDED HUNTER SUPPORT DEVICE

BACKGROUND OF THE INVENTION

1. Field of the Invention

The present invention relates generally to a device for supporting hunters within a tree, and more particularly to a device a hunter pulls up the tree with him as he climbs the tree and to a device on which the hunter can sit or stand once he has climbed the tree.

2. Description of the Related Art

It has been recognized that an advantage is obtained in hunting deer and other game by occupying a position above the ground and by preventing deer from sensing any motion of a hunter. Such a position avoids the deer's vision, sense of smell and highly developed ability to detect motion.

One approach to avoiding discovery by deer and other game was for hunters to construct a hand-made platform once the hunter had scaled the tree. Such hand-made platforms could be fabricated from a variety of materials, such as wood. However, handmade platforms have disadvantages in that the material, which may be heavy, had to be carried up the tree. Moreover, assembling a hand-made platform could be dangerous when elevated from the ground. Further, hand-made platforms were often not comfortable.

Another approach to avoiding discovery was to use a prefabricated support device which attaches to a tree, a "tree stand". A prefabricated tree stand is described in U.S. Pat. No. 4,337,844 and is shown in FIG. 1. As can be seen, the tree stand had a cross bar 2 and two diagonal bars 4 (one shown) which grip the tree 5. The tree stand further has a seat 6 accommodating a hunter. The hunter's legs rest on a leg rest 8 under the hunter's knees.

The method of using this prior art tree stand was that, when on the ground, the hunter would position cross-bar 2 to a place on parallel bars 10 in accordance with the presumed girth of the tree at a sitting position above the ground. The hunter would then straddle the tree stand so that parallel bars 10 were outside of the hunter's legs and the seat 6 was between the hunter's leg. The hunter would then scale the tree, pulling the tree stand up as he climbed. Once at the desired position on the tree, the hunter would remove his legs from between the seat 6 and parallel bars 10 and turn around to the sitting position. However, there are numerous problems associated with the prior art tree stand. For example, the position of cross bar 2 could not be adjusted once the hunter had scaled the tree. In this manner, the hunter may have over predicted the girth of the tree. This would force the hunter to sit at too great of an angle to the ground. Similarly, if the hunter under predicted the girth of the tree, the tree stand would be more horizontal than desired.

A further problem is associated with the danger in turning around in the tree stand. Once the hunter had reached a desired hunting position, he had to carefully balance on the tree stand while holding his gun. It is possible the hunter would fall off the tree stand at this point. If the hunter was a smaller person, it is also conceivable that the hunter could fall out of the tree when sitting, between seat 6 and parallel bars 10.

A further problem associated with prior art tree stand devices is that leg rest 8 is uncomfortable under the knees of the hunter, possibly disturbing circulation and the proper curvature of the spine.

SUMMARY OF THE INVENTION

Accordingly, it is an object of the present invention to provide a tree suspended hunter support device in which the device can be adjusted to the appropriate girth of the tree even after the hunter has climbed the tree.

It is a further object of the present invention to provide a tree suspended hunter support device in which the hunter does not have to straddle a seat when climbing the tree.

It is a yet further object of the present invention to avoid danger caused by open spaces between the seat and the tree stand.

It is a still further object of the present invention to provide a tree suspended hunter support device in which a hunter can sit comfortably and avoid discomfort under the knees.

These and other objects are accomplished with a tree suspended hunter support device having two parallel bars, a tree wrap member, a cross bar and a bag. According to the present invention, the two parallel bars extend in a first direction and have first and second ends. The tree wrap member extends between the two parallel bars at a first end of the parallel bars. The cross bar is positioned toward the first end of the parallel bars, and the position of the cross bar can be adjusted in the first direction. The cross bar together with the tree wrap member are adapted for closely surrounding a tree trunk. The bag encloses at least a potion of the two parallel bars such that a bottom of the bag is towards the first end of the parallel bars and rests on the cross bar. The bag has two holes in the vicinity of the bottom so that the parallel bars extend through the bag. The bag has a length and width sufficient for partially enclosing a human torso.

Other features, objects and advantages of the present invention will become apparent upon reading the following detailed description in connection with the drawings.

BRIEF DESCRIPTION OF THE DRAWINGS

FIG. 3 is a perspective view of a tree gripper which fits on the hunter support device shown in FIG. 2;

FIG. 4 is a perspective view of large and small telescoping tubular members which are part of the hunter support device shown in FIG. 2;

FIG. 5 is a perspective view of a perspective of a tree wrap which is part of the hunter support device shown in FIG. 2.

FIG. 6 is a perspective view of an adjustable clamp for adjusting the position of a cross bar of the hunter support device shown in FIG. 2.

FIG. 7 is a perspective view of a foot rest which is part of the hunter support device shown in FIG. 2;

FIG. 8 is an assembled perspective view of a hinge joint which connect the foot rest, a leg member a fork bar which are part of the hunger support device shown in FIG. 2;

DETAILED DESCRIPTION OF THE PREFERRED EMBODIMENT

Figure 2:
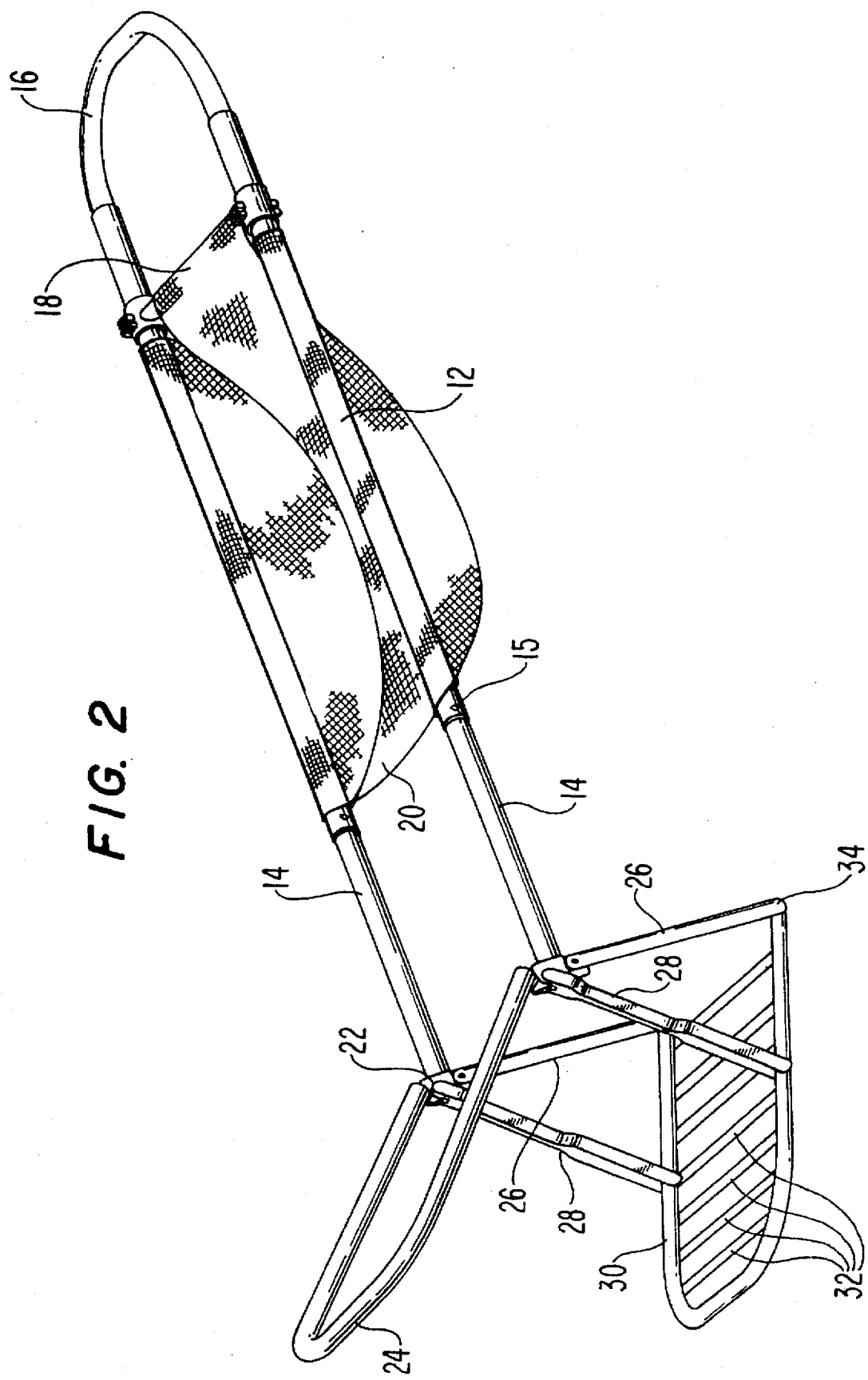
FIG. 2 is a perspective view of a tree suspended hunter support device according to the present invention.

Referring more specifically to the drawings wherein like numerals indicate like elements throughout, FIG. 2 is a perspective view of a tree suspended hunter support device according to the present invention. As shown in FIG. 2, the tree suspended hunter support structure of the present invention has two parallel bars extending in a first direction. Each parallel bar has a large tubular member 12 and a small tubular member 14 which telescopes within the large tubular member 12. A tree wrap 16 connects the two parallel bars at a first end thereof. A cross bar 18 is positioned toward the first end of the parallel bars, and the position of cross bar 18 can be adjusted in the first direction. The cross bar 18 together with the tree wrap member 16 are adapted for surrounding a trunk of a tree. That is, the tree trunk fits within tree wrap 16 and cross bar 18. When weight is applied to the tree stand, the upper surface of tree wrap member 16 and the lower surface of cross bar 18 grip the tree to hold the tree stand in a suspended position. A bag 20 encloses at least a portion of the two parallel bars such that a bottom of the bag is towards the first end of the two parallel bars and rests on cross bar 18. To show large tubular member 12, a portion of the bag which would normally enclose large tubular member 12, is not shown. The bag has two holes in the vicinity of the bottom so that large tubular members 12 can extend through the bag. The bag has a length and width sufficient for partially enclosing a human torso, buttocks and proximal thighs. The bag 20, when on the parallel bars 12, 14 has a hammock effect allowing the hunter to sit therein. The bag 20 is made of a light weight material, such as ultralight nylon mesh. The bag 20 may be camouflaged.

According to a preferred embodiment of the present invention, a tree gripper shown in FIG. 3 attaches to cross bar 18 through holes 21. When the tree gripper is attached to the cross bar 18, a portion of bag 20 is between the tree gripper and cross bar 18. According to the preferred embodiment, the cross bar 18 connects to the tree through the tree gripper so that cross bar 18 does not actually make contact with the tree. Thus, the tree gripper stabilizes the tree stand and protects the bag from wear by the tree.

One end of each small tubular member 14 is connected to a hinge joint 22 which will be described in more detail later. Extending from hinge joint 22 is a foot rest 24 which extends away from and at an angle to the second ends (left side of FIG. 2) of the two parallel bars. When with the hunter sits in bag 20 which forms a seat, the hunter can place his feet on foot rest 24. The angle foot rest 24 makes with the parallel bars 12, 14 ensures proper curvature of the lumbar spine to avoid lower back discomfort.

Also extending from hinge joint 22 is a platform section which includes leg member 26, fork bars 28, platform frame 30 and support member 32. The platform section extends at an angle to parallel bars 12, 14 such that the foot rest 24 and the platform are on opposite sides of the plane in which the parallel bars 12, 14 extend. Leg member 26 is connected to platform frame with a platform hinge 34. As can be seen in FIG. 2, fork bars 28 have forked ends, and platform frame 30 can fit within the forked ends. A pin connection is used to connect platform frame 30 to the forked ends at various positions of the forked ends.

Support member 32 is surrounded and supported by platform frame 30. Support member 32 must have a strength sufficient for supporting a hunter standing thereon. Support frame 32 is shown as bars connecting one side of platform frame 30 to the other. Platform frame 30 may be plastic, composite or other lightweight material. However, platform frame 30 may also be a metal mesh, such as an aluminum mesh.

By adjusting the position of platform frame 30 with respect to fork bars 28, it is possible to keep support member 30 in which a hunter stands horizontal. For example, if the tree stand is fastened tightly to a tree trunk by having cross bar 18 tightly against the tree trunk, the parallel bars 12, 14 will be more horizontal. In this case, it is necessary to adjust platform frame 30 towards the bottom of the forked ends of fork bars 28. To the contrary, if the tree stand is adjusted loosely to the tree by moving cross bar 18. Away from the tree wrap 16 such that the diameter of the tree trunk is somewhat smaller than the distance from cross bar 18 to tree wrap member 16, the parallel bars 12, 14 will slope downward and be less horizontal. In this case, platform frame 30 should be positioned towards the top of forked ends of fork bars 28 to keep support member 32 horizontal.

Figure 1:
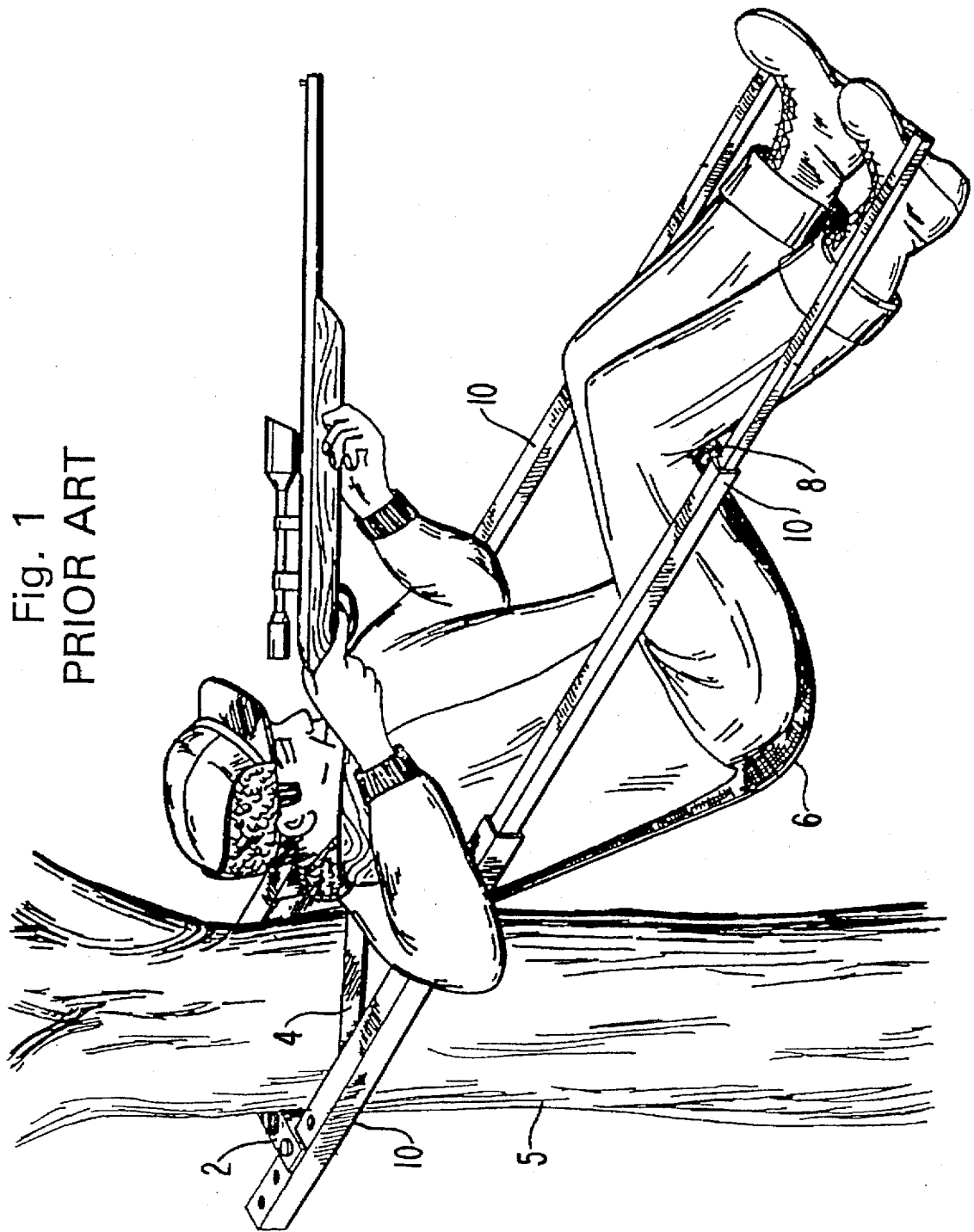
FIG. 1 is a pictorial view of a hunter sitting in a tree stand of the prior art.

FIG. 4 is a perspective view of large tubular member 12 and small tubular member 14 shown in FIG. 1. As mentioned previously, small tubular member 14 telescopes within large tubular member 12. Large tubular member 12 has holes 36, 42 extending therethrough. Hole 42 are for attachment to tree wrap 16. Small tubular member 14 has a series of holes 38 extending therethrough. With a pin extending through holes 36 and 38, it is possible to vary the length of the parallel bar formed by tubular members 12, 14. This allows the tree stand to accommodate for different leg length. As can appreciated from viewing FIG. 2, when small tubular member 14 is further extended from large tubular member 12, the distance from seat bag 20 to foot rest 24 is greater. The pin which extends through tubular members 12, 14 has a protruding portion 15 which catches on bag 20 to prevent bag 20 from extending past the pin towards the foot rest.

As can be seen in FIG. 4, the tubular members 12, 14 have an oval cross section. Because most of the force exerted on tubular members 12, 14 is in a vertical direction because of gravity, the long axis of the oval is vertical when the tubular members 12, 14 are attached to the tree stand. The horizontal forces on the tree stand are much less because substantially the only cause of lateral force is back and forth movement of the hunter. Less support is necessary in a horizontal direction, and therefore the short axis of the oval is horizontal when the tubular members 12, 14 are attached to the tree stand. The oval cross section construction increases strength, and minimizes cost of material, weight and space consumption.

The tubular members 12, 14 may be made of the same material as the other frame members of the tree stand, such as foot rest 24, tree wrap 16 and platform frame 30. This material may be aluminum, a magnesium alloy, a filament wound composite or an impregnated composite.

FIG. 5 is a perspective view of the tree wrap member 16. As can be seen from FIG. 5, tree wrap member 16 has a rounded shape which corresponds with the shape of a tree. Tree wrap member 16, like tubular members 12, 14, had an oval cross section. Holes 40 in tree wrap 16 allow tree wrap 16 to be fixed to large tubular members 12 with pins extending through holes 40 and holes 42 (see FIG. 4) in large tubular member 12.

FIG. 6 is a perspective view of an adjustable clamp 44 which allows the position of cross bar 18 to be adjusted on tubular members 12, 14. Adjustable clamp 44 has an inner section 46 and an outer section 48 which together surround large tubular member 12. Inner section 46 has a protruding section 50 having a hole 52 extending therethrough. As with tubular members 12, 14, cross bar 18 is hollow. By being hollow, cross bar 18 can receive protruding portion 50. A rivet through hole 52 and a corresponding hole in cross bar 18 attaches adjustable clamps 44 to the ends of cross bar 18.

Inner and outer sections 46, 48 can be tightened together with a mechanism (not shown) to grip the large tubular member 12. Likewise, inner and outer sections 46, 48 can be loosened away from one another so that adjustable clamps 44 and cross bar 18 can slide on large tubular member 12.

FIG. 7 is a cross sectional view of foot rest 24. As can be seen in FIG. 7, foot rest 24 has straight sections 54 and curved sections 56. Foot rest 24 has holes 58 for attachment to hinge joint 22, as will be described later. Platform frame 30 may have the same construction as foot rest 24.

Figure 10:
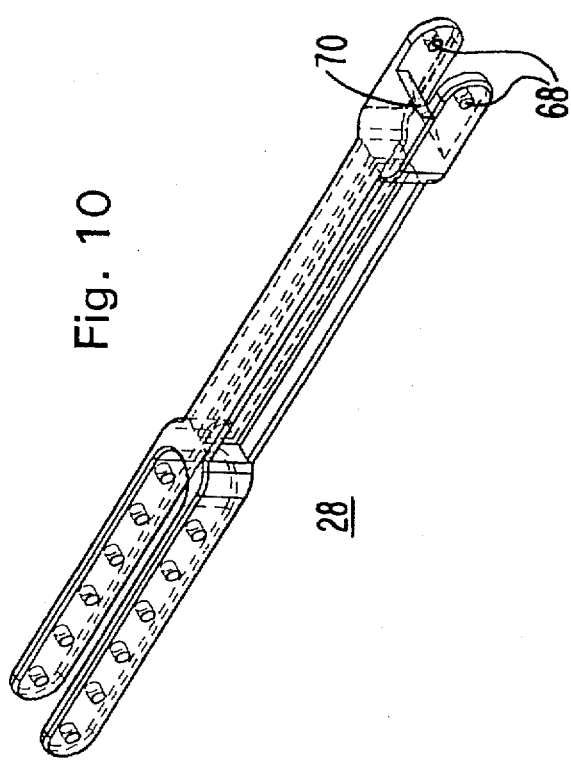
FIG. 10 is a partially removed perspective view of the fork bar which is part of the hunter support device shown in FIG. 2.
Figure 9:
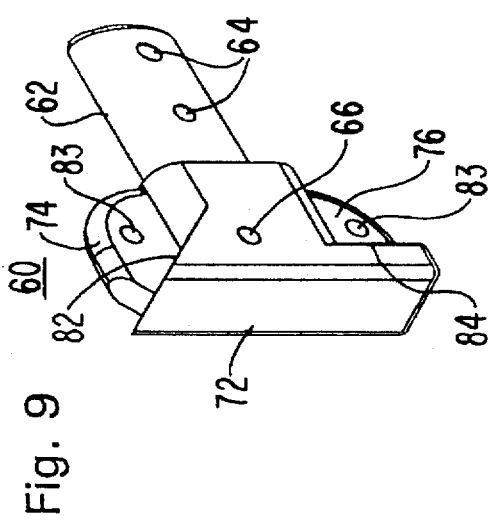
FIG. 9 is a pin connection joint of the hinge joint shown in FIG. 7.

FIG. 8 is a perspective view of hinge joint 22. Hinge joint 22 has a pin connection piece 60, and a perspective view of pin connection piece 60 is shown in FIG. 9. FIG. 8 shows small tubular member 14, foot rest 24, leg member 26 and fork bar 28 attached to pin connection piece 60. As can be seen in FIG. 9, pin connection piece 60 has a protruding portion 62 which fits within small tubular member 14. Rivets extending through small tubular member 14 and holes 64 in protruding portion 62 allow pin connection piece 60 to be connected to small tubular member 14. Hole 66 in pin connection piece 60 is for removable attachment to fork bar 28 which is shown in a perspective partially removed view in FIG. 10. Fork bar 28 is shown in FIG. 10 as being straight. However, fork bar 28 may be curved away from tubular members 12, 14. In this manner, the shape of fork bar 28 will correspond with the radius of movement of platform frame 30.

A pin extending through holes 68 in fork bar 28 and hole 66 in pin connection piece 60 removably attaches fork bar 28 to pin connection piece 60. Fork bar 28 has a bevelled surface 70 which rests on vertical surface 72 of pin connection piece 60 when the tree stand is in use. In this manner, fork bar 28 is prevented from falling vertical and remains at the angle shown in FIG. 2. Pin connection piece 60 has an upper male part 74 and a lower male part 76 respectively for attaching to the foot rest 24 and leg member 26.

Figure 11:
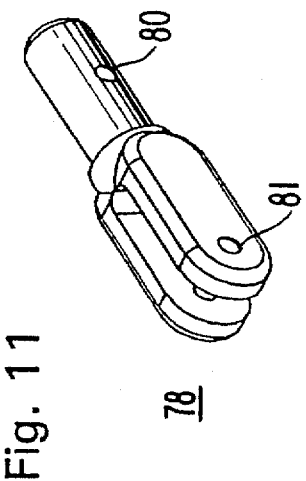
FIG. 11 is a perspective view of a slotted pin connection used in the hinge joint shown in FIG. 7.

FIG. 11 is a perspective view of a female hinge part 78 which is attached to foot rest 24 and leg member 26 with a rivet extending through hole 80. For the foot rest 24, the rivet will extend through hole 58. A rivet extending through hole 81 in female hinge part 78 and holes 83 extending through male parts 74, 76 (see FIG. 9) connect female hinge part 78 to pin connection piece 60. Pin connection piece 60 has an upper contoured surface 82 on which the female hinge part 78 for the foot rest 24 lays when the tree stand is in use. In this manner, the foot rest 24 can fold back against the tree stand to overlap small tubular member 14, above small tubular member 14. However, when the tree stand is in use, the foot rest is held at the angle shown in FIG. 2 and is prevented from falling downward.

Pin connection piece 60 has a lower contoured surface 84 on which the female hinge part 78 attached to leg member 26 can rest when in use. In this manner, the lower male part 76 and lower contoured surface 84 allow leg members 26 to fold under the tree stand, to overlap small tubular members 14. However, leg members 26 are prevented from extending too far forward.

Figure 12:
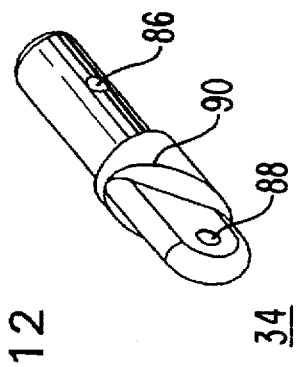
FIG. 12 is a perspective view of a platform hinge for connecting a leg member to a platform frame which are part of the hunter support device shown in FIG. 2.

FIG. 12 is a perspective view of the platform hinge 34 which connects leg members 26 to platform frame 30. Platform hinge 34 is male hinge part which fits in leg member 26. Platform hinge 34 is connected to leg member 26 with a rivet extending through hole 86 in a manner similar to previous connections. Female hinge part 78 shown in FIG. 11 is attached to either end of platform frame 30. A rivet extending through holes 81 in female hinge part 78 and a hole 88 in platform hinge 34 secures the platform frame 30 to the leg member 26. Platform hinge 34 has a contoured surface 90 on which female hinge part 78 rests when the tree stand is in use. (When in use, contoured edge 90 extends downward and away from the tree stand. Contoured edge 90 maintains platform frame 30 in a horizontal position and prevents it from falling downwards.) Platform hinge 34 also allows the platform frame 30 to be folded back under the tree stand with leg member 26. When folded back under the tree stand, leg member 26 is under small tubular member 14, and platform frame 30 is under leg member 26.

The use of the tree stand will now be described. Referring to FIG. 2, when the tree stand is first assembled, tree wrap 16 is not attached to large tubular member 12. At this time, bag 20 is pulled over cross bar 18 and large tubular members 12. Thereafter, it is not necessary to remove bag 20. The tree gripper shown in FIG. 3 is then permanently affixed onto the cross bar 18 with two bolts extending respectively through holes 21. As previously mentioned, the tree gripper shown in FIG. 3 adds tree gripping ability as well as protects bag seat 20 from wear.

Figure 13:
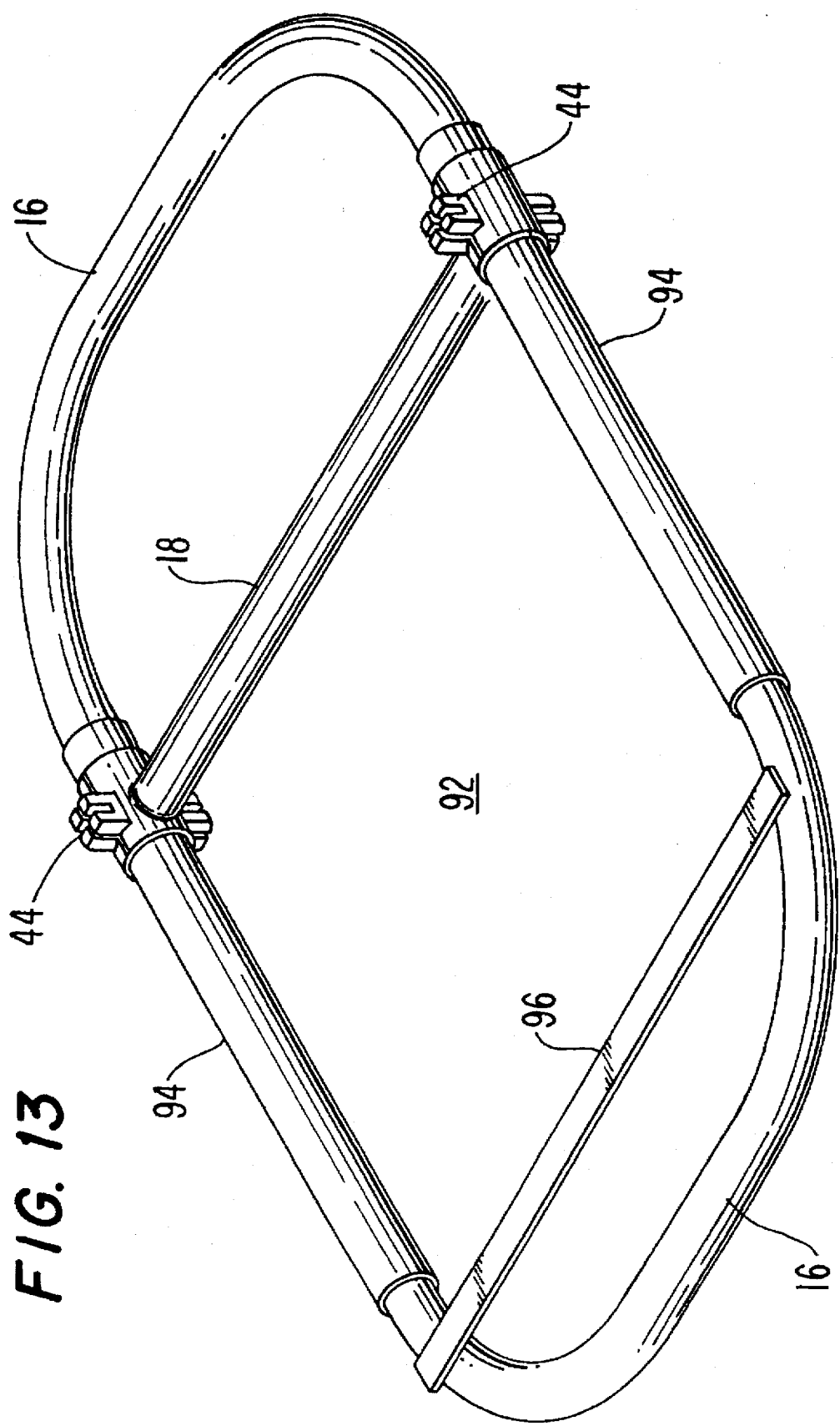
FIG. 13 is a perspective view of a tree climber for use with the hunter support device shown in FIG. 2.

When the hunter comes upon a tree from which he wishes to hunt, the tree wrap 16 is secured around the tree and attached to large tubular members 12. Bag 20 is then pushed upward on large tubular members 12, toward cross bar 18. At this time, a tree climber 92 shown in FIG. 13 is also attached to the tree. Tree climber 92 may be formed of the same pieces used for several parts of the tree stand. For example, tree wrap 16 may be used at both ends of tree climber 92, as shown. A cross bar 18 similar to that used for the tree stand is used together with the adjacent tree wrap 16 to surround the tree. For allowing cross bar 18 to move on climber bars 94, adjustable clamps 44, which may be the same adjustable clamps 44 used for the tree stand, are used. Climber bars 94 may have the same construction, but be shorter than, large tubular members 12 of the tree stand. A climbing plate 96 connects the external tree wrap 16 of the tree climber 92. Attaching the tree climber 92 to a tree is done in the same way as attaching the tree stand to a tree. That is, the tree wrap 16 adjacent to cross bar 18 is inserted into climber bars 94 after surrounding tree. Then the position of cross bar 18 with respect to the tree and the adjacent tree wrap 16 is adjusted with adjustable clamps 44. After the tree climber 92 is attached to the tree, the hunter steps within large tubular members 12 of the tree stand and begins to scale the tree. As the hunter climbs, he pulls the tree climber 92 up the tree with his feet and pulls the tree stand up with his hands. The tree climber 92 may be tethered to the tree stand to prevent the two from separating. When at a desired hunting position, the hunter can adjust the position of the cross bar 18. Then the hunter can lock the tree stand in place by pushing down on the tree stand. The hunter next pulls bag 20 downwards so that he can sit in bag 20 and rest his feet on foot rest 24. It has been shown that the tree stand is very safe and comfortable even after hours of use. Should the hunter desire to stand up, for instance to shoot a bow, he can stand on support member 32. When the hunter is standing on support member 32, foot rest 24 serves as a safety guard rail, preventing the hunter from falling.

Although a few preferred embodiments of the present invention have been shown and described, it would be appreciated by those skilled in the art that changes may be made in these embodiments without departing from the principles and spirit of the invention, the scope of which is defined in the claims and their equivalents.

I claim:

1. A tree suspended hunter support device comprising:

two parallel bars extending in a first direction and having first and second ends;

a tree wrap member extending between the two parallel bars at a first end of the two parallel bars;

a cross bar positioned toward the first end of the parallel bars, the position of the cross bar being adjustable with respect to the parallel bars in the first direction, the cross bar together with the tree wrap member being adapted for closely surrounding a tree trunk; and a bag enclosing at least a portion of the parallel bars such that a bottom of the bag is toward the first end of parallel bars, resting on the cross bar, the bag having two holes in the vicinity of the bottom, the two parallel bars extending through the holes in the bag, the bag having a length and width sufficient for partially enclosing a human torso, buttocks and proximal thighs.

2. A tree suspended hunter support device according to claim 1, further comprising a footrest extending away from and at an angle to the second ends of the parallel bars.

3. A tree suspended hunter support device according to claim 2, further comprising a platform section extending away from and at an angle to the parallel bars such that the footrest and the platform are on opposite sides of a plane in which the parallel bars extend, the platform section having a standing portion which is substantially parallel to the ground when the cross bar and tree wrap surround a tree trunk.

4. A tree suspended hunter support device according to claim 3, wherein the platform section comprises:

a pair of leg members respectively extending away from the second ends of the parallel bars;

a pair of fork bars respectively extending away from the second ends of the parallel bars and at an angle to the leg members, the fork bars having forked ends;

a platform frame having two outer portions connected to the leg members and two inner portions adapted for fitting between the forked ends of the fork bars and attaching to various positions of the forked ends with pins; and a support member surrounded and supported by the platform frame, the platform frame and support member forming the standing portion.

5. A tree suspended hunter support device according to claim 4, wherein the support member comprises bars extending between the inner portions of the platform frame.

6. A tree suspended hunter support device according to claim 4, wherein the support member is a metal mesh.

7. A tree suspended hunter support device according to claim 1, wherein the two parallel bars each comprise:

a large tubular member extending from the first end to a middle portion of the parallel bars;

a small tubular member extending from the middle portion to the second end and adapted to telescope within the larger tubular member; and a connection piece for connecting the large and small tubular member, the top of the bag being attachable to the connection piece.

8. A tree suspended hunter support device according to claim 7, wherein the large and small tubular members have an elliptical cross section with the long axis of the cross section extending perpendicular to the plane in which the tubular members extend and the short axis of the cross section extending in the plane in which the tubular members extend.

9. A tree suspended hunter support device according to claim 4, wherein pin connection pieces are used to connect the footrest, leg members and fork bars to the second end of each of the parallel bars, each pin connection piece comprising:

an outer portion which fits in the second end of one of the parallel bars and extends in the first direction with the parallel bars;

an upper surface having a planar surface portion extending generally parallel to the plane in which the parallel bars extend and an angled portion which extends away from the tubular members and the planar surface portion to an outer end which forms a corner of the connection piece, the angled portion being at an angle to the first direction an upper male part extending perpendicular to the plane in which the parallel bars extend, and from the upper surface;

a lower surface having a planar surface portion extending generally parallel to the plane in which the parallel bars extend and a perpendicular surface portion extending perpendicular to the plane in which the parallel bars extend and positioned adjacent to the planar surface portion, further from the parallel bars than the planar surface;

a lower male part extending perpendicular to the plane in which the parallel bars extend, and from the lower surface; and an outer surface extending from the outer end of the upper surface and parallel to the perpendicular surface of the lower surface.

10. A tree suspended hunter support device according to claim 9, further comprising female hinge joints connecting the foot rest and leg members respectively to the upper and lower male parts of the pin connection piece.

11. A tree suspended hunter support device according to claim 9, wherein the fork bars have a contoured surface which is substantially flush with the outer surface of the pin connection piece when the fork bars are at an angle to the first direction.

12. A tree suspended hunter support device according to claim 7, wherein the cross bar has hollow outer portions and the position of the cross bar is adjustable in the first direction with an adjustable clamps on opposing ends of the cross bar, each adjustable clamp surrounding the large tubular member, and having inner and outer halves which can be tightened together to grip the large tubular member and loosened to allow the adjustable clamp to slide on the large tubular member, the inner clamps having a protruding portion which can be received with the hollow outer portions of the cross bar, the protruding portions having a hole extending therethrough for attachment to the hollow portions with a pin.

* * * * *